(12) United States Patent
Andreason

(10) Patent No.: US 6,614,888 B1
(45) Date of Patent: Sep. 2, 2003

(54) DEVICE AND METHOD FOR TELECOMMUNICATION SYSTEMS

(75) Inventor: Tomas Andreason, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/271,977

(22) Filed: Mar. 19, 1999

(30) Foreign Application Priority Data

Mar. 2, 1999 (SE) .............................................. 9900747
Mar. 2, 1999 (SE) .............................................. 9900760

(51) Int. Cl.$^7$ .............................................. H04M 11/00
(52) U.S. Cl. ................. 379/93.02; 379/93.07; 379/196
(58) Field of Search .......................... 379/90.01, 91.02, 379/92.03–92.04, 93.01, 93.07, 93.09, 93.14, 196–198, 207, 211, 245; 370/352–356, 401; 709/225–229

(56) References Cited

U.S. PATENT DOCUMENTS

| | | | |
|---|---|---|---|
| 5,557,665 A | * 9/1996 | Yamamoto | 379/198 |
| 5,870,465 A | 2/1999 | Hosbach et al. | |
| 5,999,607 A | * 12/1999 | Spahl et al. | 379/93.02 |
| 6,041,114 A | * 3/2000 | Chestnut | 379/211.02 |
| 6,233,234 B1 | * 5/2001 | Curry et al. | 370/401 |
| 6,292,904 B1 | * 9/2001 | Broomhall et al. | 709/225 |
| 6,304,565 B1 | * 10/2001 | Ramamurthy | 370/352 |

FOREIGN PATENT DOCUMENTS

| | | | | |
|---|---|---|---|---|
| WO | WO 97/18662 A1 | 5/1997 | | |
| WO | WO 97/18662 | * 5/1997 | ............ | H04M/3/54 |
| WO | WO 97/47118 A1 | 12/1997 | | |
| WO | WO 97/47118 | * 12/1997 | ............ | H04M/3/42 |
| WO | WO 98/10573 A2 | 3/1998 | | |
| WO | WO 98/44701 A1 | 10/1998 | | |

* cited by examiner

Primary Examiner—George Eng

(57) ABSTRACT

The present invention relates to a device and a method for a telecommunication system comprising an exchange (1), which comprises a network connection device (6), which provides a user (A) with the possibility to connect a computer (12) to a data network (3), as well as a telephony server (7), which provides said user with the possibility to, during an ongoing data network session, use the service telephony on the same subscriber line (14), which is being used for the data network connection. The invention makes the handling of user information in the exchange (1) more efficient, by providing the network connection device and the telephony server with user information, which is entered in one single user data base (10). The data base is used for operation and maintenance personnel entering static user information and for entering session related user information, which is obtained during one single access control at connection to the data network (3). The information in the data base is accessible to both the network connection device and the telephony server, which makes a second access control, when activating the service telephony during an ongoing data network session unnecessary. The present invention decreases the amount of duplicated user information in the exchange and makes handling of user information in the exchange easier.

4 Claims, 6 Drawing Sheets

DEVICE AND METHOD FOR TELECOMMUNICATION SYSTEMS

TECHNICAL FIELD

The present invention relates to telecommunication in general and to user information handling in an exchange in particular.

BACKGROUND

Today more and more people use the possibility to connect their home computer to the employer's intranet to be able to work from home. Often the companies provide their employee's with user names and passwords, which make it possible to connect to the company's intranet via the company's private branch exchange, PBX (Private Branch Exchange). The connection is done so that the employee calls the exchange, by means of his home computer and a modem, enters his user name and password and after a check of these is permitted access or denied access to the intranet. The check is made, among other things in order to make sure that non-authorised persons do not access internal company information.

The international application PCT/SE98/00512 describes a device and a method for connecting a computer to a data network via an exchange. The exchange is equipped with a network connection device that sets up the connection between the computer and the data network. At the establishment of the connection, a network address, belonging to the network connection device, is associated with the computer, or more exactly with the telecommunication connection to which the computer is connected.

A technology that "doubles" the telephone line has been developed in order for a person having a single telephone line to have his computer connected to a data network, via the telephone network, and simultaneously be able to use the service telephony. The technology is based on the technology to send speech signals, via the data connection, in packets, which follow the standard protocol TCP/IP, i. e. IP-telephony. The TCP/IP protocol is sometimes referred to as the Internet protocol and the data network, which from the beginning used this protocol, is called the Internet. It was originally developed to link computers together within the defence and the educational system in the USA, but has now grown to a global network. Since many intranets of companies and organisations are connected to the Internet, it is possible to consider the Internet as a network consisting of many linked intranets.

The service phone doubling, is as mentioned, the service that makes it possible for a subscriber to be connected, via his telephone line, to a data network and simultaneously receive or make phone calls. This service is employed by a subscriber by means of call forwarding calls to his telephone, according to prior art, to a telephone number associated with a particular telephony server. This telephony server stores information about which network address is associated with a computer of a particular user. Calls to and from the subscriber are handled by the telephony server, which has the ability to code and store speech signals in data packets according to the TCP/IP protocol and send these to the computer of the subscriber over the existing data connection. Thus, the user uses the computer in stead of the ordinary telephone. For this purpose, a telephony application must be run on the user's computer. The telephony application handles inter alia the communication with the telephony server. The international application WO-A1-97/47 118 describes in detail how a subscriber is given the possibility to telephone during an ongoing Internet-session.

A company in which employee's are allowed to work from home can use a Virtual Presence Server alongside the company exchange, as described in the international application WO-A1-97/18 622. The purpose of the Virtual Presence Server is to provide an employee with access to all the services, which he has access to at his office, also when he is at home.

Another solution for the company is to provide the company exchange with both a network connection device and telephony server to provide the employees with the possibility to connect to the intranet, via the exchange, and simultaneously, under an ongoing intranet session, have the possibility to receive calls to the office at home. The network connection device and the telephony server have each a data base for storing user related information. The operation and maintenance personnel of the exchange enter information about valid users in the respective data base, which then is used to allow or deny a user access to the use of the network connection device and the telephony server, respectively, with their two corresponding types of services: connection to the intranet via the exchange and doubled telephony. A user employing both types of services must at two occasions send information to the exchange, which then is stored in the data bases in the network connection device and in the telephony server. When connecting to the intranet, the user must first enter user name and password. The network connection device checks this information against the information about valid users that is stored in the data base of the network connection device. If the user name and the password are valid, information is stored, in relation to the user name in the user data base of the network connection device, about the timeslot which is used for the communication connection with the network connection device and a network address which is allocated to the user to set up the data connection to the intranet. When the telephony application is activated, the information about the user is stored in the user data base of the telephony server. The user must when activating the telephony application enter user name and password, which must be checked against the information which is stored in the user data base of the telephony server and be accepted as valid, for the activation of the service to be allowed. The telephone number, which shall be forwarded, and the network address employed for the data connection are stored in the user data base of the telephony server, in relation to the present user name, when the user name has been verified by the telephony server. Since a lot of information, which is stored in the databases of the network connection device and of the telephony server, is identical, much information is duplicated by this method.

DISCLOSURE OF THE INVENTION

A private branch exchange which is used to provide a user with the possibility to log in by his home computer; to the company's intranet via the private branch exchange and to provide the users with the service doubled telephony, stores much information twice. The user information must be administered, which implies that a duplication of the user information in the exchange often leads to a duplication also of the administration of this information.

The network connection device is responsible for connecting users via the exchange to the intranet and a telephony server in the exchange is responsible for providing the service doubled telephony. Both the network connection device and the telephony server have user data bases comprising information about which users are allowed to use the respective service, which the network connection device and the telephony server provide, respectively. The operation and maintenance personnel of the exchange enter the information about valid users of the respective service. If a user has access to both of said services, the information about the user must be stored in both the data base of the network connection device and in the database of the telephony server, which implies that operation and maintenance personnel must enter the information about the user twice, one time in each of the two data bases.

A subscriber who wants to employ the two mentioned services; connection of his home computer to the intranet via the exchange and the service of doubled telephony is forced to go through access controls at two occasions. One occurs at the intranet connection and the other occurs at the activation of the service doubled telephony. At both controls, the user identity of the subscriber is checked. A valid user is permitted access to the intranet and the service, whereas a non-valid user is denied the same. After that the user is approved, the information about the user is stored in one of said user data bases. At the connection to the intranet, the information is stored in the user data base associated with the network connection device. At activation of the service doubled telephony, it is the user data base of the telephony server that stores information about the user. The information that is stored in the two user data bases is to a great extent the same.

Thus, a problem that exists with the technology and the method as described above, is that much of the information is duplicated in the exchange.

Another problem is that the administration of the user information becomes extensive. The operation and maintenance personnel must several times enter identical information twice and the subscriber is forced to go through two at least partly identical access controls when using the services connection to the intranet via the exchange and duplicated telephony. At the access controls, information entered by the user is checked against the information entered by the operation and maintenance personnel. It would be desirable with only one control.

The present invention solves the above mentioned problem by entering the user information, which the network connection device and the telephony server use, in a common data base, where it then is accessible to both units.

The operation and maintenance personnel enter information about the users of the services of the exchange in the common data base.

This information can comprise restrictions on a user's rights to use any or both of the services doubled telephony and connection to the intranet over the exchange. From the data base, the telephony server is provided the user information that has become known in connection with the access control at the connection to the intranet. Since the identity of the user already has been verified in the access control to the intranet, a second access control and information collection during activation of the service doubled telephony is not necessary. The information already known about the identity of the user can be used for permitting or denying access to the service doubled telephony. The user information, which the telephony server uses, is obtained from the user information earlier stored in connection with the intranet connection.

According to a preferred embodiment of the invention, the network connection device and the telephony server are integrated. Then, they form a single unit having an associated user data base, into which user information is entered, which shall be compared to two user data bases required today. According to another embodiment of the invention, the data bases of the network connection device and of the telephony server are integrated with the user data base of the exchange. Thus, the invention reduces the amount of duplicated user information in the exchange.

The invention has the advantage that it makes the operation and maintenance more simple for the personnel, who do not have to enter the information several times and for the user who does not have to go through two access controls with entering of user identities and other requested information.

Yet another advantage is that the equipment of the exchange can be made simpler, having considerably reduced administration of the user information, in particular for the telephony server. The telephony server can be integrated with the network connection device.

Yet another advantage is that the duplicated information in the exchange is decreased. Depending on how the information is stored, the invention can imply a saving in memory and in execution time during storing of information.

The object of the invention is to simplify the methods for connection to a company's intranet and the use of the service doubled telephony via a private branch exchange. The methods are simplified, from the user's point of view as well as from the point of view of operation and maintenance personnel.

The object is further to simplify the equipment, which is required in an exchange for providing the services connection to a data network via the exchange and doubled telephony. The simplification in the exchange is particularly based on that the amount of duplicated information is decreased.

The invention will now be described by preferred embodiments with reference to the accompanying drawing figures.

DESCRIPTION OF PREFERRED EMBODIMENTS

Figure 1:
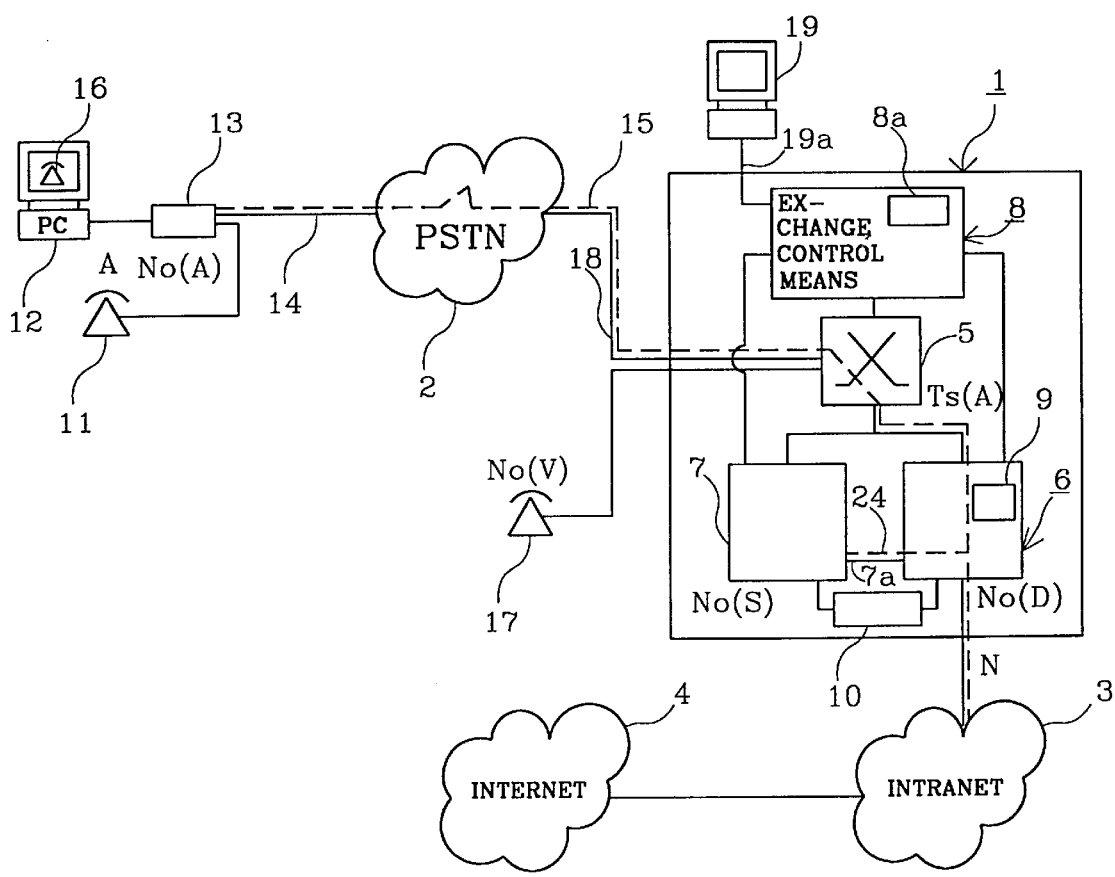
FIG. 1 illustrates a block schematic of an exchange according to the invention and the units, which co-operate with the exchange in a telecommunication system.

FIG. 1 illustrates an exchange 1 (PBX) connected between a public telephone network 2 (PSTN) and a data network 3 in the form of an intranet. The intranet 3 is in turn connected to another data network 4 in the form of the Internet. The exchange 1 comprises an switch core 5 which is connected to the public network 2 and a network connection device 6 which is connected between the switch core 5 and the intranet 3. A telephony server 7 is connected to the switch core 5 and the network connection device 6. An exchange control means 8 is connected to the switch core 5, the network connection device 6 and the telephony server 7. The network connection device 7 comprises access control means 9 for identity check of users who want access to some of the services provided by the exchange. The telephony server 7 and the network connection device 6 are connected to a data base 10 for storing user information. A user A has a telephone 11 and a personal computer 12 connected to the telephone network 2 via a modem 13 and a subscriber line 14. By the means of the personal computer 12 and the modem 13, it is possible for the user A to establish a data connection 15 with the intranet 3 and possibly also with the Internet 4 via the exchange 1. It is possible to activate a telephony application 16 on the personal computer 12. A telephone 17 is directly connected to the exchange 1 and is allocated a telephone number No(V). The intranet 3 can be implemented in some local network such as a LAN (Local Area Network) of the type Ethernet or Token Ring.

The connection 18 between the telephone network 2 and the switch core 5 is preferably a telephone line over which digital telecommunication signals are transported in the form of PCM signals in frames and timeslots according to technology known to a person skilled in the art.

Figure 2:
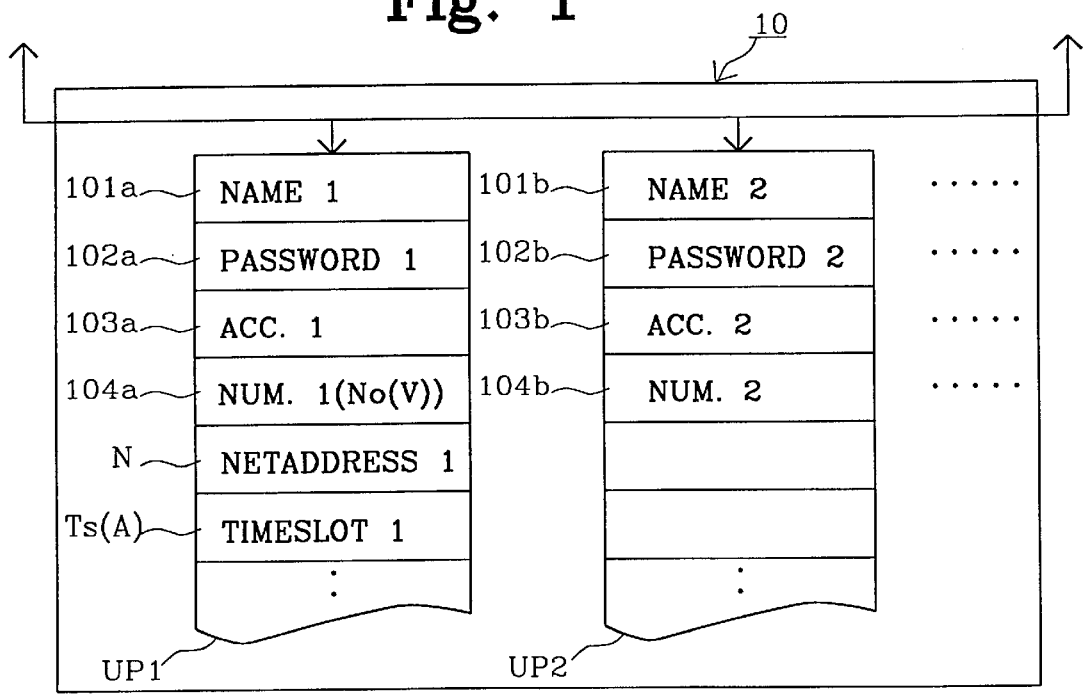
FIG. 2 illustrates a block schematic of a data base in the exchange illustrated in FIG. 1.

To the control means of the exchange 8, a terminal 19 is connected by means of a connection 19a. The terminal is used by the operation and maintenance personnel of the exchange for entering user data in the data base 10. The information which the personnel enter into the data base is for instance user names 101a, 101b, passwords 102a, 102b for valid users and the user's access rights 103a, 103b to the services connection of the intranet via the exchange and doubled telephony, as illustrated in FIG. 2.

Physically, a connection 7a between the telephony server 7 and the network connection device 6 can go via for instance the intranet 3. According to the logical schematic way of illustration shown in FIG. 1, the connection 7a is regarded as a direct connection independent on the underlying physical implementation. The same relates to the connection 19a between the terminal 19 and the exchange control means 8, which physically can be a direct connection or an indirect connection via for instance the intranet 3 or the switch core 5 and PSTN 2. In FIG. 1 the terminal 19 is logically shown as directly connected to the exchange control means 8.

The exchange 1 makes it possible for the user A to connect his personal computer 12 to the intranet 3 and use the service doubled telephony, i.e. the service that makes it possible for a subscriber to be connected, via his telephone line, to a data network and at the same time receive or make telephone calls. It is assumed in the example, that the telephone 11 is the user's A home telephone, the personal computer 12 is the user's home computer and the telephone 17 is the user's A office telephone. It is further assumed that the user A wants to have his personal computer 12 connected to the intranet 3 and simultaneously, by means of the service doubled telephony, have the possibility to receive calls to the telephone number No(V), i.e. calls to the telephone 17 at the user's office. The connection to the intranet 3, i.e. the establishment of the data connection 15 between the personal computer 12 and the intranet, is handled by the network connection device 6. At the establishment of the data connection 15, a network address N, belonging to the network connection device, is associated with the personal computer 12, or more precisely with the subscriber line 14 to which the computer is connected. To activate the service doubled telephony, the user A uses the telephony application 16. The telephony application 16 forwards the telephone number No(V) according to prior art, for instance CSTA (Computer Supported Telephony Application), to a telephone number No(S) associated with the telephony server 7. Thereby, the telephony server becomes the receiver of an incoming call to the telephone number No(V). The telephony server 7 communicates with the telephony application 16 over the established data connection 15 and informs, by means of this connection, the user about the incoming call through a message on the user's personal computer 12. If the user A chooses to take the call, the telephony server sees to it that speech information is sent as IP-signals over the established data connection 15. The user employs the telephony application 16 and the computer's equipment, such as sound cards, speakers and microphone, in order to communicate. Also outgoing calls during an ongoing intranet session are made by means of the personal computer 12 over the existing data connection 15 and are handled by the telephony application 16 and the telephony server 7.

To only allow the subscribers with authorisation access to the intranet 3 and the possibility to use the service doubled telephony, the user must go through an identity check, also called access control. For this purpose authorised users are provided with a user name and a password. The data base 10 comprises user profiles UP1, UP2 for all valid users, as illustrated in FIG. 2. The user profiles comprises information stored by the operation and maintenance personnel about the user's user names, 101a, 101b, password 102a, 102b, access rights 103a, 103b to the services of the exchange, connection to the intranet via the exchange and doubled telephony, and according to the example, a connection number 104a, 104b in the exchange related to the user. Before a user, for instance the user A having the profile UP1, is allowed to connect to the intranet 3, the exchange 1 requests the user name and the password. The validity of these is controlled against the register 10 of the data base having the valid user names 101a, 101b and the corresponding passwords 102a, 102b. An approved user is permitted access to the intranet 3, while a non-approved user is denied the same. According to the example, the user name 101a and the password 102a of the user A are present in the same user profile UP1, which leads to an approval when the user enters these. The approved user is also permitted access to the service doubled telephony if it is allowed according to the user's user profile. Information about the user that is necessary for providing the services of the exchange is stored in connection with the access control. The user enters parts of the necessary information. Other parts are received by the exchange automatically, for instance by signalling.

Both the network connection device 6 and the telephony server 7 are dependent on user-based information in the form of the verified user name 101a and the network address N that is associated with the data connection 15. The network connection device 6 is also dependent on information about the timeslot Ts(A) for the connection 15 to the switch core. The telephony server 7 is also dependent on information on the number that is forwarded No(V) when using the service doubled telephony. According to this embodiment of the invention, the telephone number to be forwarded is the connection number 104a in the exchange, which is related to the present user name 101a of the user A, and the number is obtained from the user profile UP1 in the data base 10.

In FIG. 1, the data base 10 is common for the network connection device 6 and the telephony server 7 and is used for storing said required user information: the user name 101a, the password 102a, the access rights 103a, the telephone number 104a, the network address N and the timeslot Ts(A), as illustrated in FIG. 2. According to prior art, the telephony server and the network connection device are each provided with a respective data base which store user information in connection with two different access controls. The prior art leads to that, to some extent, identical information is retrieved at two occasions and stored in two data bases, having duplicated information, in the exchange. According to the embodiment of the invention described in FIG. 1, the exchange 1 has the only data base 10 for storing the user information that the network connection device 6 and the telephony server 7 require. Thus, the invention reduces the amount of duplicated information compared to prior art. The static user information, such as the user name 101a, the password 102a and the access rights 103a are entered in the data base 10 by means of the terminal 19 by the operation and maintenance personnel. Thus, the operation and maintenance personnel enters the information about a user of the services connection to the intranet via the exchange and doubled telephony in the single data base 10, which can be compared to prior art, when the information was entered in two data bases. The session related information, such as the network address N and the timeslot Ts(A), is collected and stored in the data base 10 at the access control in connection with the connection to the intranet 3. A second collection of information in connection to the service doubled telephony is not performed.

Figure 3:
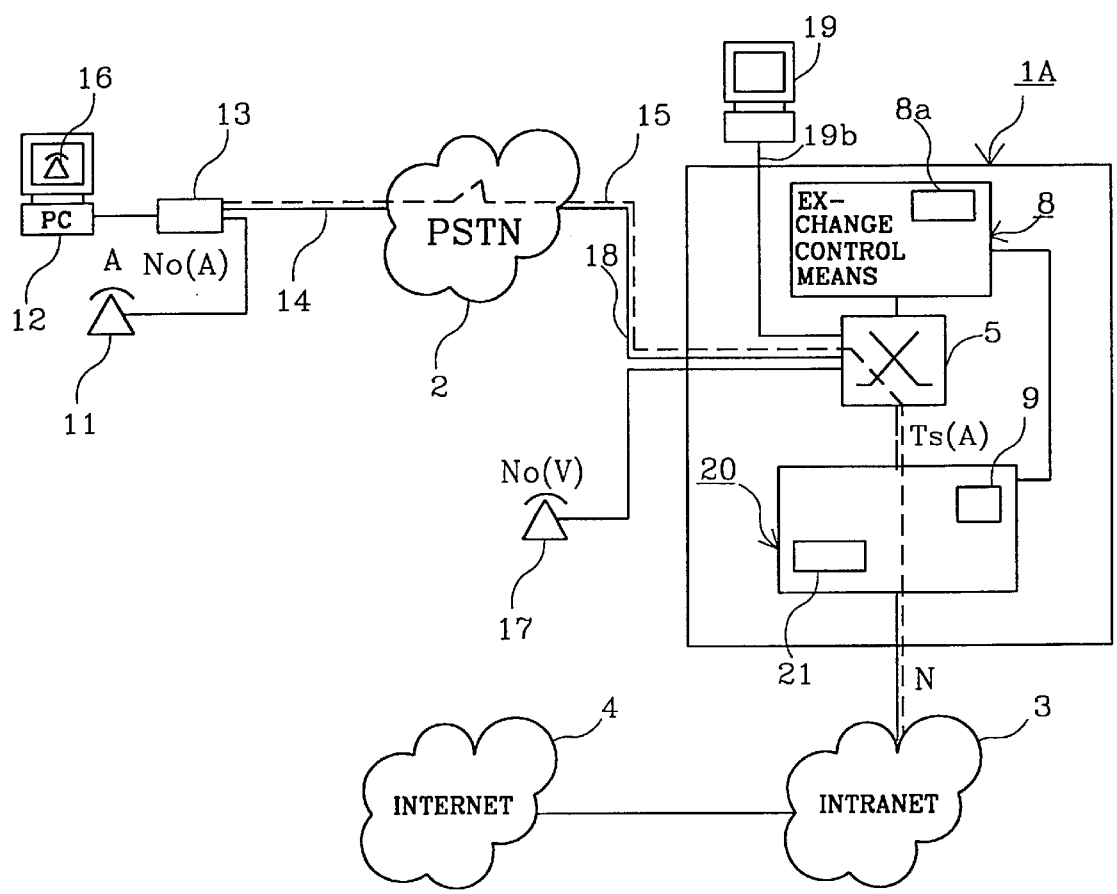
FIG. 3 illustrates a block schematic of an alternative embodiment of an exchange according to the invention and the units that co-operate with the exchange.

FIG. 3 illustrates an alternative embodiment of the invention. An exchange 1A comprises, according to this embodiment, in addition to the exchange control means 8 and the switch core 5, an integrated telephony server and network connection device 20, comprising a data base 21 for storing user information. The integrated unit 20 handles both the establishment of the data connection 15 to the intranet 3 and the provision of the service doubled telephony. For connecting the user A to the intranet 3, an access control is performed, whereby information entered by the user is checked against the user information stored in the data base 21. After the access control is finished, the above mentioned required user information, the network address N and the timeslot Ts(A), and in some cases also the telephone number of the subscriber line 14, are stored in the data base 21. At activation of the service doubled telephony, the subscriber's calls are forwarded to a telephone number associated with the integrated unit 20. The exchange IA has the terminal 19 connected to the switch core via the connection 19b.

Figure 4:
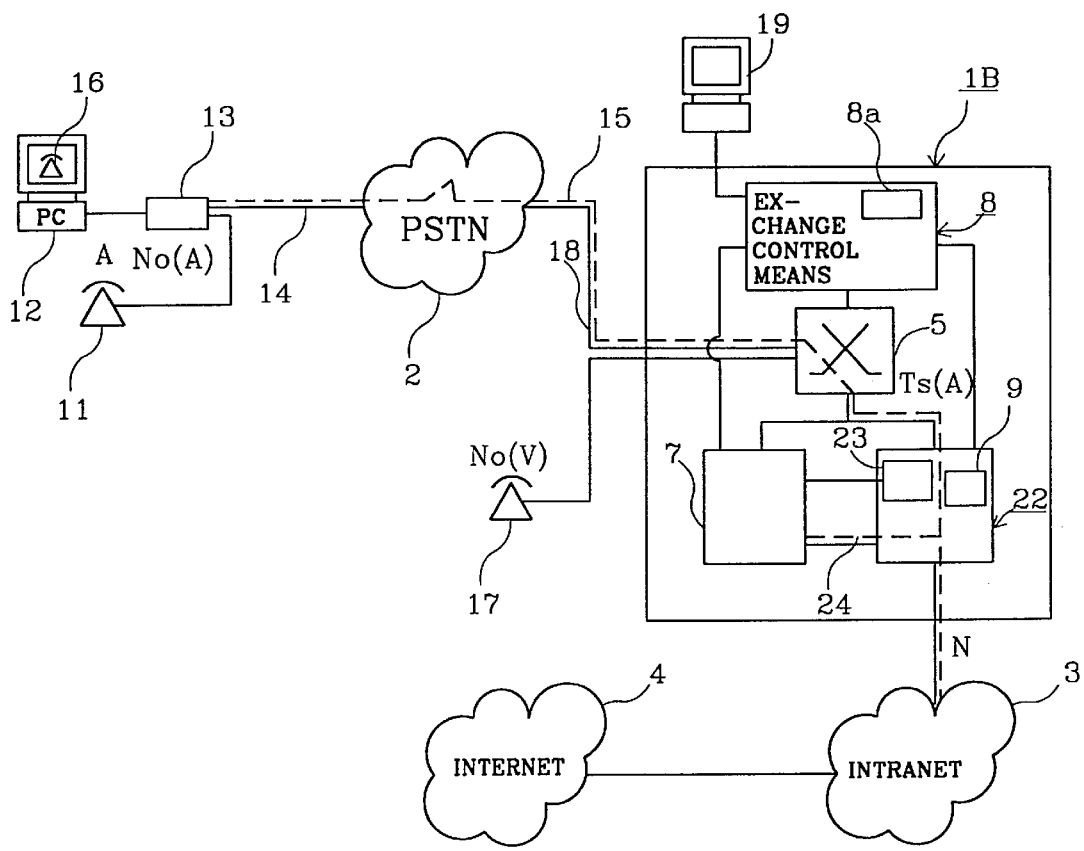
FIG. 4 illustrates a block schematic of an alternative embodiment of an exchange and the units that co-operate with the exchange.

FIG. 4 illustrates yet another alternative embodiment of the invention, in which an exchange 1 B comprises a network connection device 22 comprising a data base 23. The data base 23 is used for storing the user information that the telephony server 7 and the network connection device 22 require. The telephony server 7 is provided with the user information it requires from the data base 23 of the network connection device. There are a number of different alternatives for how the telephony server is provided with the information from the data base 23. The telephony server can for instance have access to the data base to retrieve the information it needs by it self. Another example is that the telephony server 7 sends a request to the network connection device, which then responds by sending the requested information in a message to the telephony server. If the distribution of information to the telephony server is provided by communication between the telephony server and the network connection device, this communication can for instance be handled by means of signalling via a master program in the exchange control means 8.

Yet an embodiment of the invention is to let the network connection device 22 provide the telephony server 7 with a copy of its data base 23. Then, the telephony server has to receive updated copies of the data base 23 as soon as any change occurs therein, alternatively request an updated copy at each occasion when the telephony server uses user information.

Yet another embodiment is to store the user information that the telephony server 7 and the network connection device 6, or the integrated unit 20 use in the user data base of the exchange 8a in the exchange control means 8. The data base of the exchange 8a stores for instance user profiles with information about the user's user name, connection number in the exchange and rights to make outgoing calls. The user profiles in the user data base 8a of the exchange can be supplemented with the information that particularly is needed for providing the services intranet connection via the exchange and doubled telephony. Thus, this embodiment require communication between the exchange control means 8 and one of the units the network connection device 6, the telephony server 7 or the integrated unit 20 for transferring the user information. Neither the telephony server 7, the network connection device 6, nor the integrated unit 20 require any particular data base for storing user information, since it is stored in the data base 8a in the exchange control means 8.

The way, according to which an embodiment of the invention operates, will now be described with reference to FIG. 1.

Registration of a New User

Figure 5:
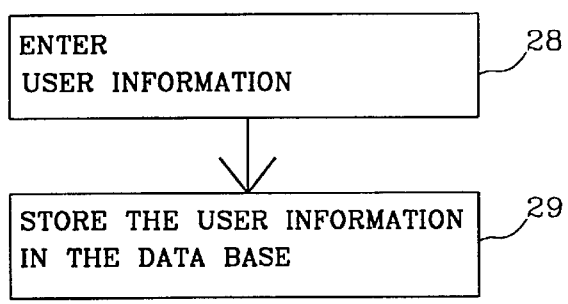
FIG. 5 illustrates a flow sheet of a method for registering of a new valid user according to the invention.

How registration of a new user is performed, is described with reference to the flow sheet in FIG. 5 and with reference to FIG. 1.

The user A shall be registered as a valid user of the service which provides the user with the possibility to connect to the intranet 3 via the exchange 1 and the service doubled telephony that is provided by the telephony server 7. Operation and maintenance personnel, enters via the terminal 19 the user's A user name 101a, password 102a and access rights 103a, and according to the example also the user's A telephone number in the exchange 104a, i.e. the user's office number No(V), step 28. Thereafter, the operation and maintenance personnel gives an order, via the terminal 19, that a user profile UP1 for the user A shall be created in the data base 10, in which the entered information will be stored, step 29. After the storing of the user's A user profile in the data base 10, A has the possibility to both use the service connection to the intranet 3 and the service doubled telephony, since the user's rights 103a to both of these services are stored in the user profile UP1 in the data base 10.

Connection to the Intranet

Figure 6:
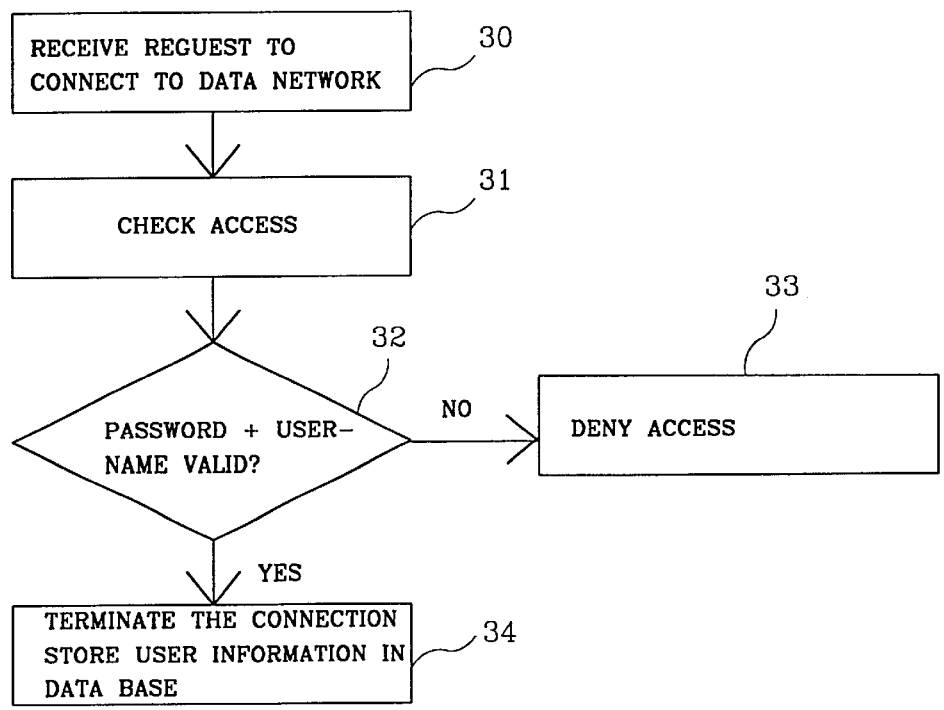
FIG. 6 illustrates a flow sheet of a method for connecting a computer to a data network according to the invention.

How connection to the intranet is performed, is described with reference to the flow sheet in FIG. 6 and with reference to FIG. 1.

The user a wants to connect his computer 12 to the intranet 3 by means of the modem 13, which is connected to the user's subscriber line 14. Therefore, the user A calls a particular number No(D) by which he can get access to the intranet 3 via the exchange 1. By calling that number, the user A requests connection to the intranet. This particular number is directly associated with the network connection device 6, which means that the network connection device immediately receives the user's request about a data connection to the intranet, step 30. The establishment of a connection through the exchange, under the control of the exchange control means 8, is performed in a way that is known to a person skilled in the art. The access control means 9 of the network connection device starts at a received request about intranet connection, an access control, step 31. In the access control, the user enters his allotted user name 101a with corresponding password 102a. The entered user name and the password are compared to said user profiles in the data base 10, in which valid combinations of user names and passwords are stored, according to FIG. 2. If the given combination of user name and password turns out to be valid, the user is approved and the connection is permitted. A non-approved user is denied connection and thereby denied access to the intranet, step 33. If user A is approved in the access control, the data connection to the intranet is set up and information about the timeslot Ts(A) used for the connection to the switch core and the network address N being associated with the data connection is stored in the data base 10 in the user profile UP1, step 34. The user's A data connection 15 to the intranet is thereby set up and can be used for transporting data according to a method known to a person skilled in the art.

Activation of the Service Doubled Telephony

Figure 7:
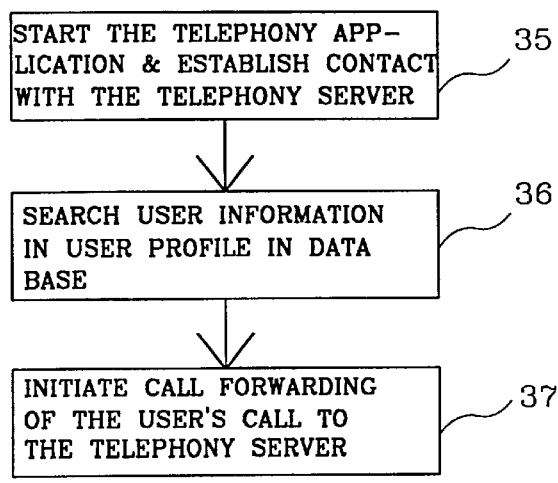
FIG. 7 illustrates a flow sheet of a method for activating, according to the invention, the service doubled telephony.

How activation of the service doubled telephony is performed, is described with reference to the flow sheet in FIG. 7 and with reference to FIG. 1.

The user A has connected his personal computer 12 to the intranet 3 via his subscriber line 14. To be able to use the subscriber line for telephony during the intranet session, the user A wants to activate the service doubled telephony. Therefore, the user starts the telephony application 16 on his personal computer 12. The telephony application establishes an IP-connection with the telephony server 7 over the already established data connection 15 and the IP-link 24, step 35. The telephony server 7 is informed by the telephony application 16 that user A wants to have incoming calls forwarded to the telephone number No(S) of the telephony server. The telephony server 7 searches in the data base 10 for the user name 101a of the user that uses the data connection 15 over which the call forwarding order was arrived. The telephony server can thereafter from the user profile UP1 obtain the connection number 104a in the exchange which is associated with the user name 101a and thus is the telephone number which shall be forwarded, step 36. In the example, the telephone number 104a in the user profile is the same as the telephone number No(V), whereby the reference numerals No(V) are used for the forwarded number from now on. The telephony server 7 connects, for user A, the service call forwarding to the number No(S) of the telephony server, step 37. No access control is performed in connection with the connection of the service doubled telephony. The identity of the user A, has already been verified in connection with the connection to the intranet 3, thus making a second access control unnecessary.

Incoming Calls

Figure 8:
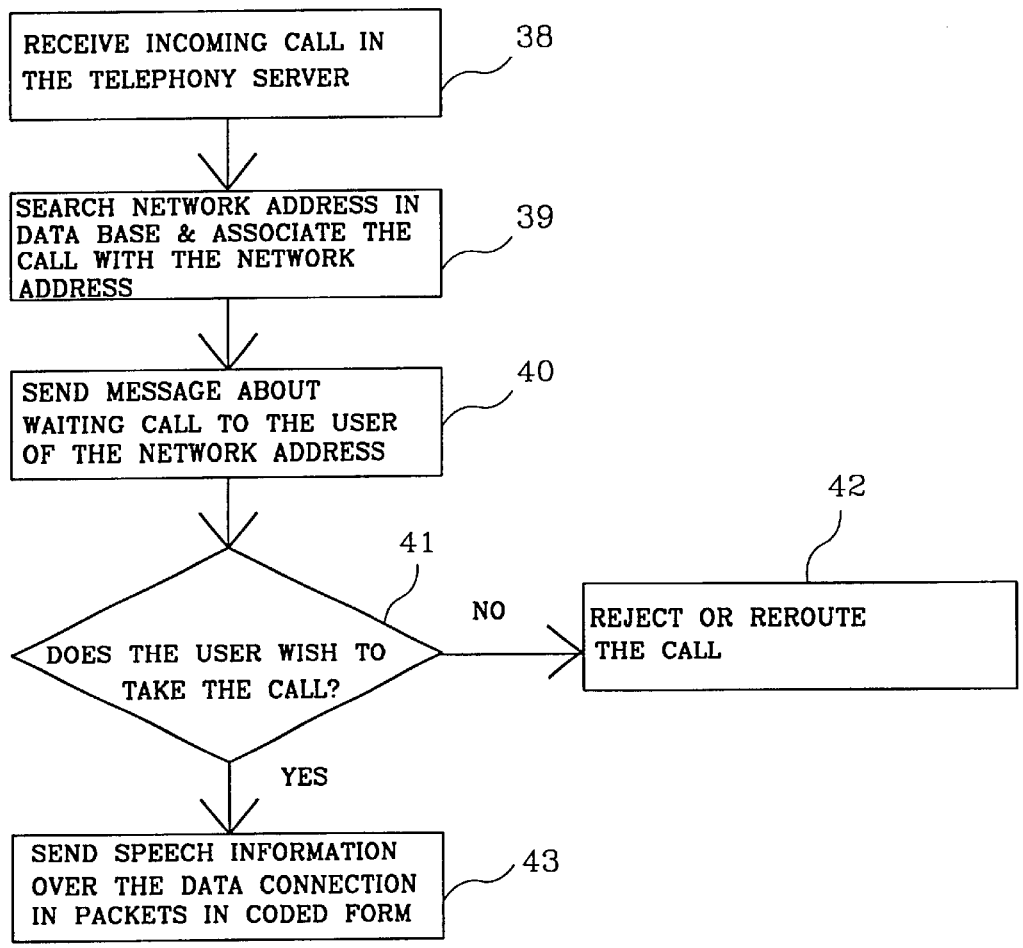
FIG. 8 illustrates a flow sheet of a method, according to the invention, for handling incoming calls to a user having activated the service doubled telephony.

How incoming calls are handled, is described with reference to the flow sheet in FIG. 8 and with reference to FIG. 1.

After activation of the service doubled telephony, all incoming calls to user A on the telephone number No(V) are routed to the telephony server 7. The telephony server receives the call having information about the telephone number the called party wants to call (i.e. No(V)), step 38. The telephony server 7 searches in the data base 10 which IP-address presently is associated with that number, i.e. the network address N being stored in the user profile UP1, thus giving information that the user A is allocated the data connection 15. The telephony server creates a relation between the incoming call and the network address N, step 39. Then, the telephony server sends a message to the user A over the data connection 15 and the IP-link 24 that a call is waiting, step 40. The user A can choose to take the call, dismiss it or request the telephony server to forward the call to for instance a voice mailbox. The user A informs, via the telephony application 16 and the data connection 15, the telephony server 7 of its choice, step 41. If the message implies that the call shall be dismissed or re-routed, the telephony server 7 handles this, step 42. If the user chooses to take the call, the telephony server provides that the communicating parties speech information is compressed and packetised and sent over the data connection according to prior art, step 43. This can be done without interrupting the intranet session of the user A.

Outgoing Calls

Figure 9:
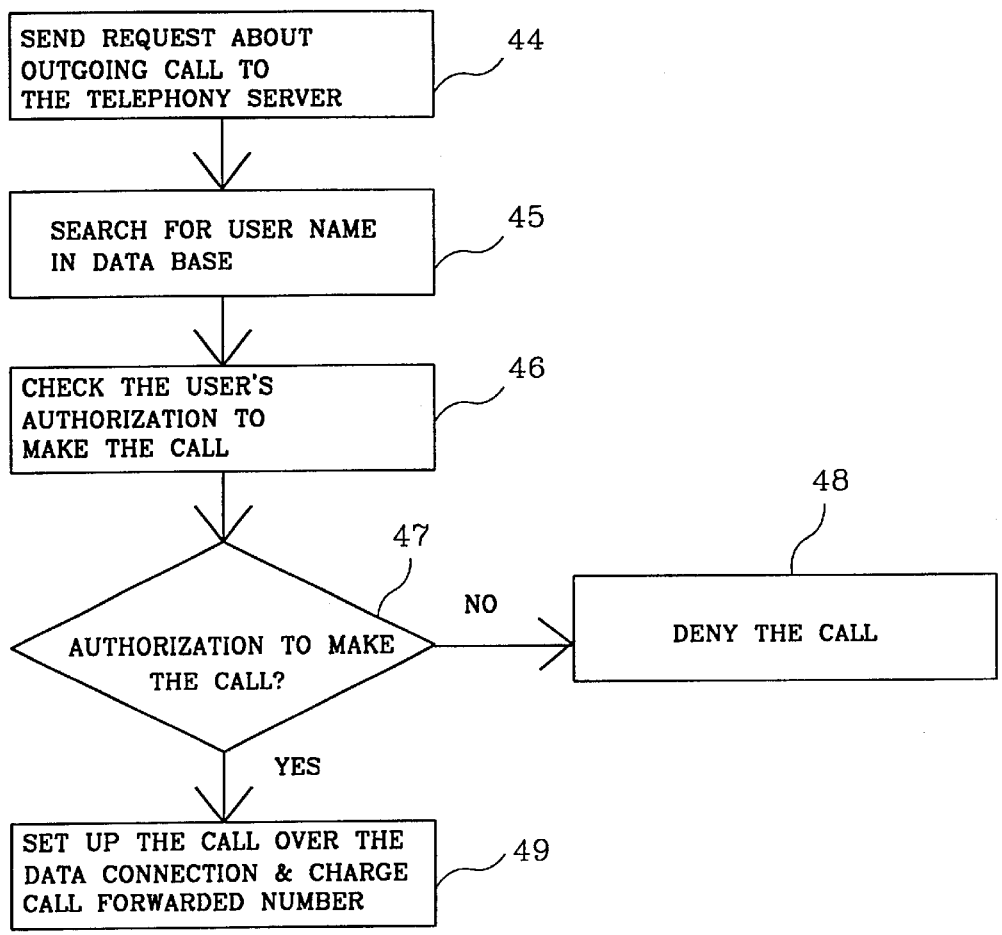
FIG. 9 illustrates a flow sheet of a method, according to the invention, for handling outgoing calls from a user having activated the service doubled telephony.

How outgoing calls are handled, is described with reference to the flow sheet in FIG. 9 and with reference to FIG. 1.

It is assumed that the user A has an ongoing intranet session and has activated the service doubled telephony, as described above. Furthermore, it is assumed that the user A wants to make an outgoing call. The user A now dials the telephone number he wants to call using the keyboard of the personal computer and requests the telephony application 16 to initiate an outgoing call. The telephony application answers by in turn sending a request to the telephony server 7, over the established data connection 15 and the IP-link 24, of making an outgoing call to the wanted number, step 44. The telephony server starts, when the request to make an outgoing call is received, to search in the data base 10 for the user name 101a, which is associated with the network address N being used for the data connection 15 over which the order about the outgoing call was received, step 45. Thereafter, are the access rights 103a, in the same user profile UP2 as the user name, examined to check if the present user is allowed to make the requested call, step 46. If the examination shows that authorisation is missing, the user A is denied the call, step 48. If there is no restriction on user A for the requested call, the set-up of the call is allowed to continue. The telephony server chooses a line to the network 2, via the switch core 5, and initiates that the requested number is called, step 49. The called party answers and the telephony server handles compression and packeting of the speech information of the parties and send this information over the data connection 15 in the form of IP-signals as described above. The call is charged to the forwarded number No(V), i.e. in the example to the connection number 104a in the exchange that is associated to the user A.

The control of the authorisation of user A to make the requested outgoing call, described above, is optional and can be excluded. Even if the control of restrictions associated with a particular user name is excluded, the telephony server has to obtain information from the data base 10 to be able to find the telephone number to which the call shall be charged.

Deactivation of the Service Doubled Telephony

Figure 10:
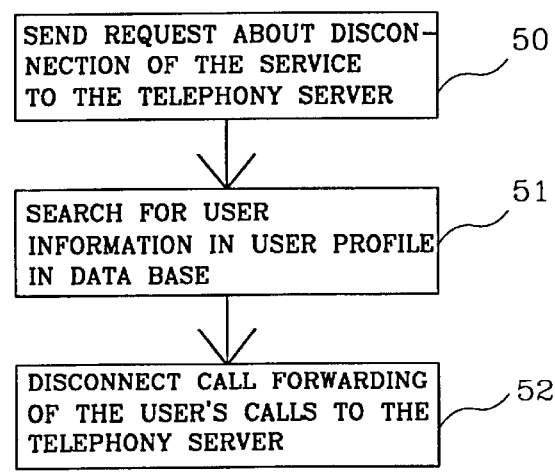
FIG. 10 illustrates a flow sheet of a method, according to the invention, for deactivating the service doubled telephony.

How deactivation of the service doubled telephony is performed, is described with reference to the flow sheet in FIG. 10 and with reference to FIG. 1.

In order to deactivate the service doubled telephony, the user A requests the telephony application 16 to be shut down. This application requests the telephony server 7 to release the forwarding of the user's A calls to the number No(V), step 50. The telephony server searches in the data base 10 for the user name 101a associated with the data connection 15 over which the request has arrived and then receives from the current user's A user profile UP1, the number 104a, herein No(V), for which the call forwarding shall be released, step 51. The telephony server 7 disconnects the call forwarding service, step 52. The information in the data base 10 does not change due to the deactivation of the service doubled telephony. The information that is stored in the data base 10 has to be accessible to the network connection device 6 as long as the intranet connection remains.

Disconnection From the Intranet

Figure 11:
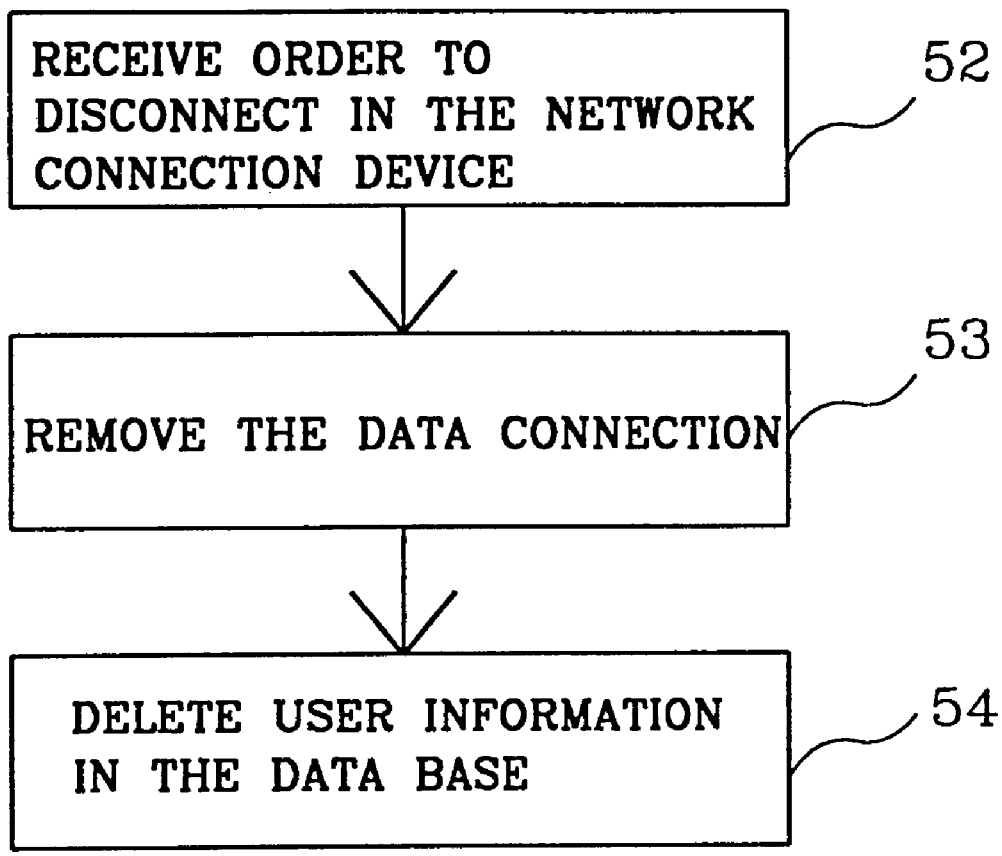
FIG. 11 illustrates a flow sheet of a method, according to the invention, for disconnecting a data network connection.

How disconnection from the intranet is performed, is described with reference to the flow sheet in FIG. 11 and with reference to FIG. 1.

When a user A wants to terminate his ongoing intranet session, he requests the modem to shut down the connection. When the network connection device 6 discovers that the connection is down, it understands this as an order of disconnection, step 52, and removes the established data connection 15, step 53, and deletes in the data base 10, the network address N and the timeslot Ts(A) which was used for the data connection, step 54.

The above described method for activation of the service doubled telephony, is based on that the telephony server 7 initiates the call forwarding of the user's A calls. In the example, the telephone number that is to be forwarded No(V) is a number corresponding to the exchange 1, which means that the call forwarding of calls from number No(V) to number No(S) is an internal call forwarding in the exchange. However, it is not necessary that it is one of the numbers in the exchange that is forwarded to the telephony server 7. The forwarded number can also be a number outside the exchange, such as the home telephone number No(A) of the user A, which implies that the call forwarding service must be activated outside the exchange 1, in the telephone network 2. An alternative is then that the user A himself initiates the call forwarding in the telephone network 2 to the telephone number No(S), using the touch-tone telephone 11, according to a prior art method. This call forwarding must then be done before the user A connects to the intranet 3, via his subscriber line 14. When the user A starts the telephony application 16 and activates the service doubled telephony, the telephony server does not have to do anything if the user already has initiated the call forwarding. It is usually desirable to test the connection between the telephony application 16 and the telephony server 7 by letting the telephony application send an inquiry to the telephony server, which answers, provided that the connection is correct. If the telephony application does not receive an answer from the telephony server, it can inform the user that contact could not be established with the telephony server. A reason for why the user A should be forced to initiate the call forwarding, could be that the telephony server 7 does not have permission to initiate the call forwarding in the telephone network 2.

To summarise, there are thus a number of possibilities to handle the call forwarding in connection with the use of the service doubled telephony. The call forwarding can be done manually in a traditional way by the user A or automatically by means of the telephony server 7. The user A can also have a standing call forwarding to the telephony server's number No(S) when the telephone number No(A) is busy.

It is notable that the user A can choose not to forward his calls to the telephony server 7 if he does not use the service doubled telephony during an ongoing intranet connection. The user's A rights can also be such that he does not have permission to use doubled telephony. According to the invention, the identity of the user is; however, stored in the same data base 8a, 10, 21, 23 independent of whether or not the user has a right to use the service doubled telephony or not.

As described above, it is not necessary that the number which is forwarded to the number No(S) of the telephony server is a number which is directly associated with the exchange 1. A possible situation is, as mentioned, that the user wants the calls to the telephone number No(A) shall be transferred to the telephony server No(S), i.e. the calls to the home telephone of the user A. To be able to receive also the calls to the office telephone having the number No(V), the user may first forward the calls of the number No(V) to the number No(A). Thus, the calls to the telephone number No(V) will also be forwarded to the number No(S) of the telephony server, by first being forwarded to the number No(A), which in turn is forwarded to the number No(S). In order for the telephony server 7 to be able to inform the right user about an incoming call, or more precisely send the acknowledgement of the incoming call to the right data network address, it must be able to associate the calls to the number No(A) with the network address N. An alternative is to let the user profile UP1 of the user A contain information about that the number No(A) is associated with the user name of the user A. However, this procedure gives the user little freedom in the way that he only can forward the numbers that are registered in his user profile UP1. Another alternative is to store the telephone number No(A), which is associated with the subscriber line 14 via which the user A performs his intranet connection, in the data base 10 at the time when the connection is set up. At the connection, the number No(A) is sent automatically, whereby no additional dialogue is required between the user A and the exchange 1, 1A, 1B for this purpose. The telephone number No(A) stored in the data base 10 is thereafter treated as session related information which is entered and thereafter deleted in connection to connection and disconnection to the intranet. The information about the incoming call is sent right owing to that the telephony server 7 searches in the data base 10 for the telephone number No(A) and sends the information about the incoming call to the network address N that for the moment is associated with the telephone number No(A) by being stored in the user profile UP1 together with No(A).

Above, methods according to the invention have been described in connection to different events with reference to the exchange 1 of the invention, which is illustrated in FIG. 1. The methods for the alternative embodiments, which are illustrated in FIGS. 3 and 4, differ slightly from the above described methods with reference to FIG. 1. These differences are described below.

For an exchange 1A according to the invention, as illustrated in FIG. 3, the methods differ from those described above in such a way that the integrated unit 20 performs the steps, which according to the description with reference to FIG. 1 are performed by the telephony server 7 or the network connection device 6. The user information is stored, retrieved and deleted in the data base 21 instead of the data base 10.

The network connection device 22 in the exchange 1B according to the invention, which is illustrated in FIG. 4, has a data base 23 for storing user information. The data base 23 corresponds to the data base 10 in FIG. 1, which is separated from the network connection device 6. In connection with connection to the intranet 3, via an exchange as illustrated in FIG. 4, the user information is stored in the data base 23 in the network connection device 22. When activating the service doubled telephony, the telephony server 7 has to obtain user information from the data base 23 in the network connection device 22. The information can for instance be transported by means of signalling between the telephony server 7 and the network connection device 22. Also in connection with the handling of incoming calls, outgoing calls and deactivation of the service of doubled telephony, the telephony server 7 must obtain user information from the data base 23 of the network connection device. When disconnecting the data connection 15, the network connection device 22 deletes the user information in the data base 23.

In order for the communication between the telephony server 7 and the telephony application 16, over the data connection 15, to work, it is in some cases necessary to inform which port number the telephony application is associated with. This is the case if the port number is variable. If the port number is fixed, no information regarding this has to be exchanged, since the telephony server knows that the port number is always the same. When the port number is variable, it can be stored as session related information in the data base 8a, 10, 21, 23. This information is entered in the data base in connection with the activation of the service doubled telephony and is deleted in connection with the deactivation of this service. It is the telephony application that, without the user having to enter anything, informs the telephony server which port number it uses. The telephony server provides that the port number is stored temporarily in the data base 8a, 10, 21, 23 in the right user profile.

The user information that is used for supporting the services connection to the data network via the exchange and doubled telephony are entered and stored in the data base 8a, 10, 21,23. The information in the data base may vary. Above, it is mentioned that the user's user name, password, access rights, forwarded number, the timeslot and the network address, which is used for the present data connection, and in some cases a port number are stored in the data base. The forwarded telephone number can be treated as static information that is entered by the operation and maintenance personnel, if it for instance is so that the user only is permitted to use doubled telephony in order to be able to receive the calls to his office telephone. An alternative is that the telephone number is treated as session related information and consists of the number associated with the subscriber line via which the user is connected to the intranet, such as described above. The user is, by this, given greater flexibility since he can use the service doubled telephony for calls to an optional telephone number. Yet another alternative is that several telephone numbers associated with the user are forwarded to the telephony server. These telephone numbers are stored in the user profile in the same way as when only one number is forwarded. The telephone numbers can be stored as session related or static information and the user profile can thereby simultaneously contain both telephone numbers stored as static information and telephone numbers stored as session related information. It is not necessary that the password and the access rights are stored in the data base. It is for instance possible that the exchange has a very simple access control, wherein all users giving a valid user name are given access to all of the services of the exchange.

Today, it has become common that information being sent over data and communication connections is encrypted to avoid bugging. Alternative access controls to the more traditional, in which user names and passwords are used have been developed. The identity of a user can be controlled according to an encryption procedure, in one or several steps, in which the user in a dialogue with the exchange can be verified by the user sending messages to the exchange, by means of an encryption key, which is used for verifying the user's identity. Thus, the invention is not limited to traditional access controls having traditional user names and passwords in the form of static letter or number combinations. Independent of which type of identification method is used, information about the identity of the user is stored, according to the invention, in the data base 8a, 10, 21, 23 and is treated as some kind of user name independent of whether this information is in the form of the name of the user, an encryption key or the user's connection number in the exchange.

What is claimed is:

1. An exchange in a telecommunications system comprising:
    a switching device;
    a data network connection device connected to the switching device;
    a telephony server connected to the switching device;
    a user information database accessible from both the network connection device and the telephony server; and
    an exchange controller that receives user information that is entered once via an input terminal, and stores the user information in the user information database within the exchange,
    wherein:
        the user information database receives and stores the user information, said user information database being accessible from both the network connection device and the telephony server for verification of the user information, said user information identifying the user and specifying the user's rights to use both the data services and the telephony services;
        the switching device establishes a first communication connection for exchanging data between a user's computer and the data network connection device within the exchange;
        the data network connection device establishes a second communication connection with a remote data network, said second communication connection providing data services with the remote data network, said network connection device requiring verification of the user information stored in the database before establishing the second communication connection; and
        the telephony server utilizes the first communication connection to provide telephony services to a telephone at the user's location while the first communication connection is also exchanging data with the user's computer, said telephony server also requiring verification of the user information stored in the database before providing the telephony services.

2. A telecommunication system according to claim 1, wherein the data network connection device and the telephony server are implemented in an integrated unit responsible both for the establishment of the data connection between the computer and the data network via the exchange, and for providing the telephony services to the user, when the user is connected to the data network.

3. A telecommunication system according to claim 2, wherein the integrated unit also includes the user information database.

4. In a telecommunications exchange having a switching device, a data network connection device connected to the switching device, a telephony server, a user information database accessible from both the network connection device and the telephony server, and an exchange controller, a method of providing a user with simultaneous access to both data services and telephony services while only requiring user information to be entered once, said method comprising the steps of:

receiving the user information by the exchange controller and storing the user information in the user information database, said user information database being accessible from both the network connection device and the telephony server for verification of the user information, said user information identifying the user and specifying the user's rights to use both the data services and the telephony services;

establishing by the switching device, a first communication connection for exchanging data between a user's computer and the data network connection device within the exchange;

establishing by the network connection device, a second communication connection with a remote data network, said second communication connection providing data services with the remote data network, said step of establishing the second communication connection including verifying by the network connection device, the user information in the database before establishing the second communication connection; and providing by the telephone server, telephony services to a telephone at the user's location utilizing the first communication connection while the first communication connection is also exchanging data with the users computer, said step of providing telephony services including verifying by the telephony server the user information in the database before providing the telephony services.

\* \* \* \* \*